United States Patent
Fulton et al.

(10) Patent No.: US 9,648,806 B2
(45) Date of Patent: May 16, 2017

(54) HYDRAULIC BRUSH CUTTER

(71) Applicant: Cross-Tech Manufacturing Inc., Crosslake, MN (US)

(72) Inventors: Joseph Gordon Fulton, Pequot Lakes, MN (US); David Heiling, Savage, MN (US)

(73) Assignee: Crosstech Manufacturing, Inc., Crosslake, MN (US)

( * ) Notice: Subject to any disclaimer, the term of this patent is extended or adjusted under 35 U.S.C. 154(b) by 29 days.

(21) Appl. No.: 14/698,524

(22) Filed: Apr. 28, 2015

(65) Prior Publication Data

US 2016/0316618 A1  Nov. 3, 2016

(51) Int. Cl.
*A01D 34/82* (2006.01)
*A01D 34/80* (2006.01)

(52) U.S. Cl.
CPC .......... *A01D 34/828* (2013.01); *A01D 34/80* (2013.01)

(58) Field of Classification Search
CPC .... A01D 34/006; A01D 34/008; A01D 34/60; A01D 34/66; A01D 34/80; A01D 34/828; A01D 34/27; A01D 34/62; A01D 34/63; A01D 34/64; A01D 34/6812; A01D 2034/6831; A01D 2075/203; A01D 75/18
See application file for complete search history.

(56) References Cited

U.S. PATENT DOCUMENTS

| | | | |
|---|---|---|---|
| 3,608,290 A * | 9/1971 | Robinson | A01D 34/66 56/192 |
| 3,729,910 A | 5/1973 | Hardee et al. | |
| 3,736,735 A | 6/1973 | Kulak et al. | |
| 3,985,196 A * | 10/1976 | Deschamps | A01D 34/6806 180/271 |
| 4,178,741 A * | 12/1979 | Lonn | A01D 75/30 56/10.2 R |
| 4,308,713 A * | 1/1982 | James | A01D 34/80 56/11.9 |

(Continued)

OTHER PUBLICATIONS

Brush Wolf, "Rotary Brush Cutter Safety Manual," Cross-Tech Manufacturing, Inc., Aug. 2011 (16 pages).
(Continued)

*Primary Examiner* — Robert Pezzuto
*Assistant Examiner* — Adam Behrens
(74) *Attorney, Agent, or Firm* — Pauly, DeVries Smith & Deffner

(57) ABSTRACT

A brush cutter includes a center deck that is pivotally coupled to a first wing deck and a second wing deck. Each deck has a hydraulic cutting assembly. A mounting portion can be attached to a front carrier portion of a drive vehicle. The brush cutter has a hydraulic manifold operably coupled to each cutting assembly and configured to be operably coupled to a hydraulic system of the drive vehicle. The manifold includes valves that control the flow of drive fluid to the hydraulic cutting assemblies. Sensing arrangements signal the valves to shut off the drive fluid to the wing decks if the wing decks pivot upward from a lowered position to a first angular position. The sensing arrangements can optionally signal the drive vehicle's hydraulic system to reduce the flow of drive fluid to the hydraulic manifold for each wing deck that pivots upward to the angular position.

20 Claims, 8 Drawing Sheets

(56) References Cited

U.S. PATENT DOCUMENTS

| | | | | |
|---|---|---|---|---|
| 4,354,341 | A | * | 10/1982 | Hathaway ............ A01D 34/001 56/320.1 |
| 4,384,443 | A | * | 5/1983 | Hoogstrate ............ A01D 34/60 56/11.9 |
| 4,429,515 | A | * | 2/1984 | Davis, Jr. ........... A01D 34/6806 56/13.6 |
| 4,442,658 | A | * | 4/1984 | Cartner ................ A01D 75/303 56/11.9 |
| 4,538,400 | A | | 9/1985 | Hottes et al. |
| 4,697,404 | A | * | 10/1987 | Brockmeier ........... A01D 75/30 172/308 |
| 4,858,417 | A | * | 8/1989 | Priefert ................. A01D 75/30 56/13.6 |
| 5,065,566 | A | * | 11/1991 | Gates ................... A01D 34/866 56/12.7 |
| 5,133,174 | A | * | 7/1992 | Parsons, Jr. ............ A01D 75/30 56/10.9 |
| 5,146,733 | A | * | 9/1992 | Klaeger ................ A01D 75/30 56/10.4 |
| 5,280,695 | A | * | 1/1994 | Nunes, Jr. .............. A01D 75/30 56/13.5 |
| 5,321,938 | A | * | 6/1994 | LeBlanc .............. A01D 34/661 56/14.7 |
| 5,435,117 | A | * | 7/1995 | Eggena ................. A01D 34/27 56/10.2 D |
| 5,706,638 | A | * | 1/1998 | Kinder ................ A01D 34/475 56/10.2 E |
| 6,138,444 | A | | 10/2000 | Torras et al. |
| 6,164,049 | A | * | 12/2000 | Burch .................... A01D 43/14 56/16.4 A |
| 6,832,466 | B2 | * | 12/2004 | Freiberg ................ A01D 75/18 56/10.4 |
| 7,340,875 | B2 | | 3/2008 | Freiberg et al. |
| 7,340,877 | B2 | | 3/2008 | Anderson et al. |
| 7,841,157 | B2 | | 11/2010 | Latuszek et al. |
| 8,544,246 | B2 | * | 10/2013 | Jackson ................ A01D 34/66 56/13.6 |
| 2004/0104546 | A1 | * | 6/2004 | Biziorek ................ A01B 61/04 280/2 |
| 2004/0201288 | A1 | * | 10/2004 | Harvey ................ A01D 34/828 307/327 |
| 2005/0193702 | A1 | * | 9/2005 | Anderson .............. A01D 75/18 56/14.7 |
| 2006/0123756 | A1 | * | 6/2006 | Eavenson, Sr. ........ A01D 34/76 56/10.2 R |
| 2015/0223397 | A1 | * | 8/2015 | Browning .............. A01D 34/76 56/17.1 |

OTHER PUBLICATIONS

Brush Wolf, "Rotary Brush Cutters—the Leader of the Pack," 72 M-AX Safety & Instruction Manual, Cross-Tech Manufacturing, Inc., May 2011 (12 pages).
CAT Products, "586C Site Prep Tractor: Designed for Your Toughest Land Management Projects," Product Brochure, Caterpillar, Inc., 2014 (24 pages).
Parker Hannifin Corporation, "Hydraulic Motor/Pump Series F11/F12," Product Catalog, selected pages, 2015 (27 pages).
Prentice Forestry Products, "2864C Site Prep Tractor: Built for Your Toughest Land Management Projects," Product Brochure, Caterpillar Forest Products, Inc. 2014 (24 pages).
Prentice Forestry Products, "MR-244 Rotary-AX Key Features," Product Specification Sheet, Caterpillar Forest Products, Inc., 2008 (1 page).
Walker EMD, "Inductive Proximity Sensors," Product Brochure, Eaton Corporation, 2012 (3 pages).

* cited by examiner

HYDRAULIC BRUSH CUTTER

FIELD

This disclosure generally relates to equipment for cutting and mulching grass, brush, trees, and other plants, and more specifically relates to rotary brush cutters and methods for cutting brush and otherwise operating such equipment.

BACKGROUND

Cutting and mulching equipment is often used to cut away and/or clear brush including tall grass, plants, weeds, shrubs, wood chips, branches and the like. A common method for clearing brush involves the use of a rotary brush cutter. Rotary brush cutters typically have at least one blade that rotates in a plane generally parallel to the ground such that it uniformly cuts the brush. Some rotary cutters simultaneously operate multiple blades, thus providing a wider cutting area and reducing the overall amount of time needed to clear plant matter. Hydraulic motors typically power the cutting blades of a rotary brush cutter.

Some rotary brush cutters are configured as an attachment that can be mounted to a drive vehicle. As is known, drive vehicles of various types can be used to carry and operate different types of attachments. Examples of drive vehicles include, but are not limited to, tractors, utility vehicles, loaders, excavators, and other farm and construction equipment. These types of drive vehicles may be configured to carry one or more different attachments. One example of an attachment is a rotary brush cutter. Other examples of attachments include, but are not limited to, buckets, blades, forks, mowers, tillers, trenchers, delimbers, grapples, harvester heads, and many other attachments, depending on the size and type of drive vehicle being used.

A drive vehicle carrying a rotary brush cutter usually has a hydraulic power system that is coupled to the cutter attachment to drive the cutter's hydraulic motors, thereby powering the attached rotary cutting heads. Various types of drive vehicles can attach to and carry a rotary brush cutter. The choice of vehicle can depend on the type of application, the size of the attachment, and the power requirements of the cutter attachment. For example, in some cases a rotary cutter may be attached to a skid-steer loader or other similarly sized vehicle to clear small amounts of grass and brush. Such cutters may have a cutting width of between 40 and 60 inches, but can also extend up to 90 inches. Rotary cutters of this size may operate using hydraulic fluid flow of less than 30 gallons per minute (i.e., gpm), and in some cases up to between 30-40 gpm.

A brush cutter having an even wider cutting width with more powerful motors and cutting heads can be useful for applications requiring large amounts of ground clearing and/or clearing of larger brush and small trees. As an example, some brush cutters may have a width approaching eight feet and operate using a hydraulic fluid flow of about 100 gpm. The additional cutting width and the greater power provided by such cutters can allow faster clearing of rugged landscapes. Such rotary brush cutters are also heavy (e.g., approaching 6,000 lbs. or more), and require a large drive vehicle, such as a site prep tractor.

While large brush cutters exist, there is still a desire in the industry for brush cutters with improved performance. This includes, but is not limited to, a desire for rotary brush cutters having increased speed and capacity, especially for forestry applications and other situations that require the clearing of brush and trees from large areas. At the same time, there remains a desire to minimize the risk of injury to operators of rotary brush cutters, as well as to others in the vicinity of such operation.

SUMMARY

One possible embodiment is directed to a hydraulically driven rotary brush cutter. The brush cutter includes a center deck, a first wing deck, and a second wing deck. The first wing deck has a first hydraulic cutting assembly, the second wing deck has a second hydraulic cutting assembly, and the center deck has a third hydraulic cutting assembly. A first side of the center deck is pivotally coupled to the first wing deck and a second side is pivotally coupled to the second wing deck. The brush cutter includes a mounting portion that is positioned at the back end of the center deck. The mounting portion is configured to be attached to a front carrier portion of a drive vehicle.

The brush cutter also includes a hydraulic manifold. The hydraulic manifold is operably coupled to each of the first, second, and third hydraulic cutting assemblies. The hydraulic manifold is configured to be operably coupled to a hydraulic power system of the drive vehicle. Among other things, the manifold includes a first valve and a second valve. The first valve controls flow of a drive fluid to the first hydraulic cutting assembly, and the second valve that controls flow of the drive fluid the second hydraulic cutting assembly.

The brush cutter further includes a first sensing arrangement and a second sensing arrangement. The first sensing arrangement signals the first valve of the hydraulic manifold to shut off flow of the drive fluid to the first hydraulic cutting assembly when the first wing deck pivots upward from a lowered position to a first angular position. The second sensing arrangement signals the second valve to shut off flow of the drive fluid to the second hydraulic cutting assembly when the second wing deck pivots upward from the lowered position to a second angular position.

In some cases, the first and the second angular positions are each approximately 15° from the lowered position for the corresponding wing deck. Pivoting of the first wing deck can be independent from pivoting of the second wing deck in some cases. One option for the hydraulic cutting assemblies is that each of the first, second, and third hydraulic cutting assemblies includes a rotary cutting head and a hydraulic motor that drives the rotary cutting head.

The first and the second sensing arrangements can sometimes include a sensing plate and a sensor. The sensor outputs a control signal to one of the first and the second valves based on relative movement of the sensing plate and the sensor. The relative movement of the sensor and sensing plate can be during the pivoting of one of the first and the second wing decks.

In some cases the sensor has a sensing face and the sensing plate covers the sensing face in the lowered position. The sensor can optionally be an inductive sensor that generates the control signal based on proximity of the sensing plate. The sensor may in some cases be mounted to the center deck with the sensing plate being mounted to one of the first and the second wing decks.

Sometimes signals from the brush cutter's sensing arrangements are related to one or both wing decks pivoting downward. For example, in one optional implementation the first sensing arrangement signals the first valve to turn on flow of the drive fluid to the first hydraulic cutting assembly when the first wing deck pivots downward from a raised position to the first angular position. Similarly, in some cases the second sensing arrangement signals the second valve to turn on flow of the drive fluid to the second hydraulic cutting assembly when the second wing deck pivots downward from the raised position to the second angular position.

In some examples of the brush cutter, the first and the second sensing arrangements signal the hydraulic power system of the drive vehicle to reduce a flow of drive fluid from the hydraulic power system. For example, when the first wing deck pivots upward to the first angular position, the first sensing arrangement can signal the hydraulic power system of the drive vehicle to reduce a flow of drive fluid from the hydraulic power system to the hydraulic manifold. As another example, the second sensing arrangement can optionally signal the hydraulic power system of the drive vehicle to reduce the flow of drive fluid from the hydraulic power system to the hydraulic manifold when the second wing deck pivots upward to the second angular position.

Another possible embodiment is directed to a hydraulically driven rotary brush cutting system. The system includes a first wing deck comprising a first hydraulic cutting assembly, a second wing deck comprising a second hydraulic cutting assembly, and a center deck having a first side pivotally coupled to the first wing deck and a second side pivotally coupled to the second wing deck. The center deck includes a third hydraulic cutting assembly. The brush cutting system also includes a mounting portion positioned at a back end of the center deck. The mounting portion is configured to be attached to a front carrier portion of a drive vehicle.

The brush cutting system also includes a hydraulic manifold that is operably coupled to each of the first, second, and third hydraulic cutting assemblies. The hydraulic manifold is configured to be operably coupled to a hydraulic power system of the drive vehicle. The manifold includes a first valve that controls flow of a drive fluid to the first hydraulic cutting assembly, and also includes a second valve that controls flow of the drive fluid to the second hydraulic cutting assembly.

The brush cutting system also includes a first sensing arrangement in communication with the first valve and the hydraulic power system of the drive vehicle. Also included is a second sensing arrangement in communication with the second valve and the hydraulic power system of the drive vehicle. The first sensing arrangement is configured to sense when the first wing deck pivots upward from a lowered position to a first angular position, signal the first valve to shut off flow of the drive fluid to the first hydraulic cutting assembly, and signal the hydraulic power system to reduce a flow of drive fluid from the hydraulic power system to the hydraulic manifold. The second sensing arrangement is configured to sense when the second wing deck pivots upward from the lowered position to a second angular position, signal the second valve to shut off flow of the drive fluid to the second hydraulic cutting assembly, and signal the hydraulic power system to reduce the flow of drive fluid from the hydraulic power system to the hydraulic manifold. In some cases, the sensing arrangements are configured to signal the hydraulic power system to reduce the flow of drive fluid by about one third of a full flow of the drive fluid.

Another possible embodiment provides a method for cutting brush with a hydraulically driven rotary brush cutter. The method includes operating the brush cutter. Operating the brush cutter includes driving a first hydraulic cutting assembly mounted to a first wing deck, driving a second hydraulic cutting assembly mounted to a second wing deck, and driving a third hydraulic cutting assembly mounted to a center deck. The center deck is pivotally coupled to the first and the second wing decks.

The method for cutting brush also includes operating the brush cutter with the first wing deck and the second wing deck in a lowered position and raising the first wing deck along a range of travel extending from the lowered position to a raised position of the first wing deck.

The method also includes sensing the raising of the first wing deck to a first position along the range of travel, generating a control signal based on sensing the raising of the first wing deck to the first position, and actuating a valve with the control signal to shut off flow of a drive fluid to the first hydraulic cutting assembly.

In some cases the method for cutting brush can also include carrying the brush cutter with a site prep tractor having a hydraulic system operably coupled to the first, the second, and the third hydraulic cutting assemblies. Another optional step includes reducing a flow of drive fluid from the hydraulic system to the hydraulic manifold based on the control signal.

Each of the hydraulic cutting assemblies can optionally include a rotary cutting head and a hydraulic motor that drives the rotary cutting head. In some cases the method for cutting brush can also include lowering the first wing deck from the raised position to the first position, sensing the lowering of the first wing deck to the first position, generating the control signal based on sensing the lowering of the first wing deck to the first position, and actuating the valve with the control signal to turn on flow of the drive fluid to the first hydraulic cutting assembly.

In some cases sensing the raising of the first wing deck and generating the control signal can optionally be performed with a first sensor arrangement having a sensing plate and a sensor that generates the control signal based on relative movement of the sensing plate and the sensor during raising of the first wing deck. In some cases the sensor is mounted to the center deck and raising the first wing deck includes moving the sensing plate relative to the sensor. In some cases moving the sensing plate relative to the sensor includes uncovering a face of the sensor.

These and various other features and advantages will be apparent from a reading of the following detailed description.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing some embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
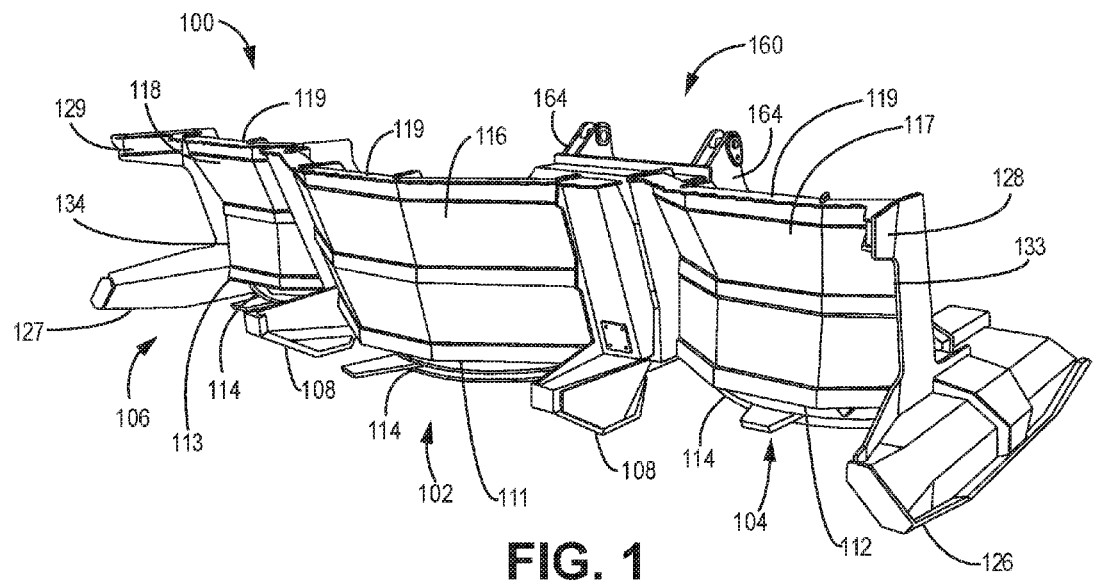
FIG. 1 is a front perspective view of a brush cutter discussed in the following detailed description.
Figure 2:
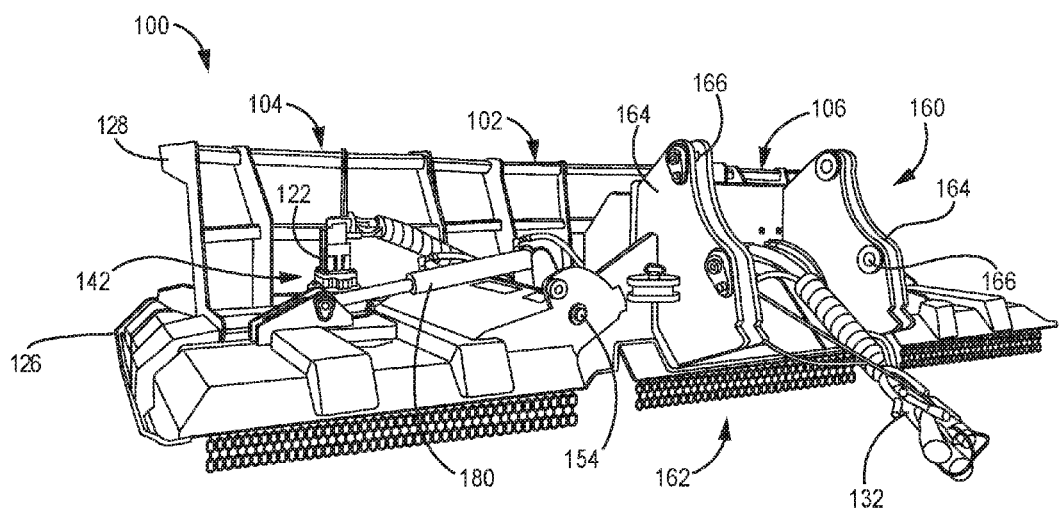
FIG. 2 is a rear perspective view of the brush cutter depicted in FIG. 1.
Figure 3:
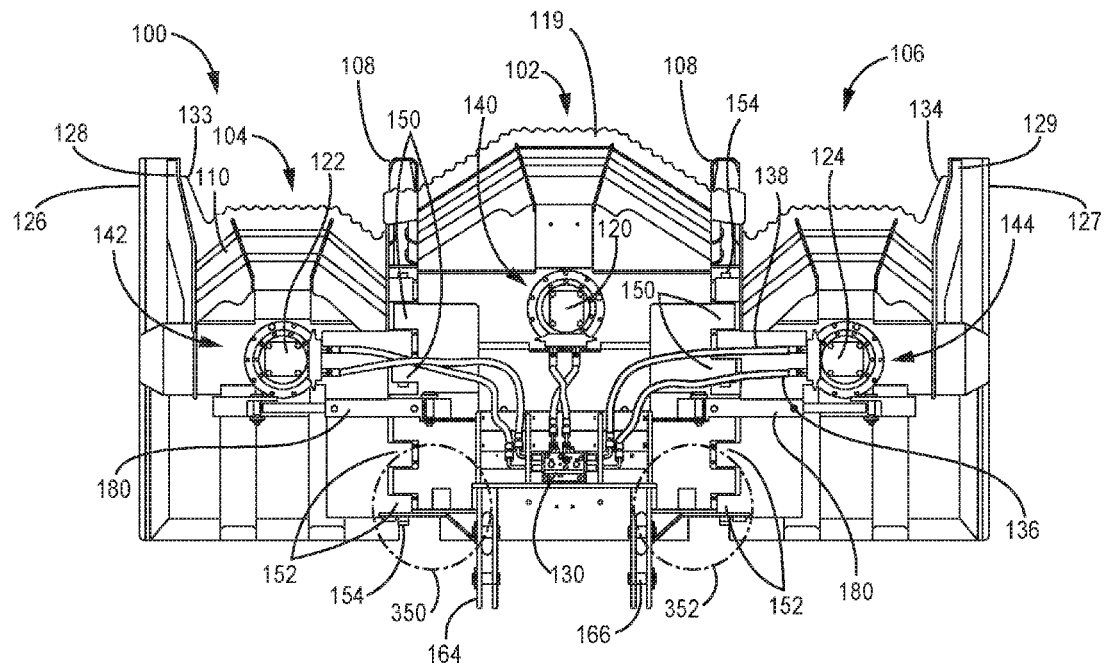
FIG. 3 is a top view of the brush cutter depicted in FIG. 1 showing a portion of a hydraulic power system.

FIGS. 1-3 are views of one example of a hydraulically driven rotary brush cutter 100 according to one possible embodiment of the invention. FIG. 1 shows a front perspective view of the rotary brush cutter 100, while FIG. 2 is a rear perspective view of the brush cutter 100. FIG. 3 is a top view of the brush cutter 100 that depicts a simplified representation of a portion of the brush cutter's hydraulic power system. For convenience, the terms brush cutter, rotary brush cutter, and rotary cutter are used interchangeably herein when discussing the figures and features illustrated therein.

As will be appreciated, at least some aspects and/or features of the invention are directed to hydraulically-powered rotary cutters capable of cutting one or more types of vegetation. Types of vegetation include brush, but are not limited to brush. Accordingly, embodiments of the invention can be useful for clearing brush, grass, exposed stumps, small trees, and/or other vegetation in a variety of settings. Some possible applications for brush cutters and brush cutting systems and methods provided by the invention include residential and commercial development, utility and pipeline right-of-way construction and maintenance, wetlands and wildlife habitat management, plantation reclamation and management, and clearing for flood control and firebreaks.

Returning to FIGS. 1-3, the brush cutter 100 includes multiple cutting decks, each of which has a hydraulic cutting assembly that includes a hydraulic motor coupled with a rotary cutting head. Referring to FIG. 1, the brush cutter 100 includes a center cutting deck 102, a left wing cutting deck 104, and a right wing cutting deck 106. (Orientation directions of left and right are only used for convenience, and are understood from the perspective of FIG. 2 in which the wing deck 104 is displayed on the left side of the center deck 102 when viewing the figure.) In the example of FIG. 1, a cutting guard is formed at the front of each cutting deck, which helps shield an operator by deflecting debris outward and/or downward as it is cut by the brush cutter 100. As shown in FIGS. 1 & 3, a center cutting guard 116 extends upward from a front edge 111 of the center cutting deck 102. A left cutting guard 117 extends upward from a front edge 112 of the left wing cutting deck 104. A right cutting guard 118 extends upward from a front edge 113 of the right wing cutting deck 106. Further, the center cutting deck 102 includes two spaced-apart skid structures 108, one at each side of the center cutting deck 102, extending from a front edge 111 of the center cutting deck 102. The left wing cutting deck 104 includes a left skid structure 126 extending forward from the front edge 112, positioned at a left outer edge 133 of the left wing cutting deck 104. The right wing cutting deck 106 includes a right skid structure 127 extending forward from the front edge 113, positioned at a right outer edge 134 of the right wing cutting deck 106. Additionally, as shown in FIG. 1, at a top edge 119 of the brush cutter, attached to the outside of the left wing cutting deck 104 is a left top guard rail 128 extending forward from a top edge 119 of the left cutting guard 117. Attached to the outer edge of the right wing cutting deck 106 is a right top guard rail 129, extending forward from the top edge 119. Both the left top guard rail 128 and the right top guard rail 129 share the top edge 119 with the brush cutter. The top edges 119 of the cutting guards have a scalloped shape.

A rotary cutting head 114 is mounted beneath each of the cutting decks 102, 104, 106. Although not shown in FIG. 1, each cutting head 114 is attached to the drive shaft of a hydraulic motor that is mounted to the top side of each cutting deck. For example, the blade carrier may be directly fixed to the drive shaft of the motor without intermediate gearing or other transmission components. FIGS. 2 and 3 illustrate the placement of the corresponding hydraulic motors 120, 122, 124 shown in this example. Each hydraulic motor 120, 122, 124 is operably coupled to a hydraulic manifold 130, which serves as a central point for distributing hydraulic fluids that power the motors. For convenience, each hydraulic motor and corresponding rotary cutting head 114 is referred to herein as a cutting assembly. Accordingly, the brush cutter 100 shown in FIGS. 1-3 includes three hydraulic cutting assemblies. These cutting assemblies are also referred to herein as a center cutting assembly 140, a left wing cutting assembly 142, and a right wing cutting assembly 144.

The brush cutter 100 in this example thus includes three cutting decks, each having a single hydraulic motor driving a corresponding rotary cutting head. Although not required, in this example the center and wing cutting decks are staggered, thus creating an amount of cutting overlap between adjacent decks. The inclusion of the wing decks 104, 106 as part of the illustrated brush cutter 100 provides an even greater cutting width than previously available, while at the same time providing the convenience of a reduced attachment width when the wings are folded up. In one possible implementation, a brush cutter is provided with the three cutting decks illustrated in FIGS. 1-3 in order to have a total cutting width of about sixteen feet. This wide cutting width can lead to faster cutting at greater rates, which in turn can mean that it takes less time to clear a given area of land.

While the example shown in the figures includes a center cutting deck, two wing decks, and a single motor/cutting head for each deck, it should be appreciated that multiple variations with different numbers of decks and/or different numbers of motors are possible.

As will be discussed in further detail, the brush cutter 100 is configured to be attached to and operated by a drive vehicle that has its own hydraulic system for powering attachments that are carried by the drive vehicle. The hydraulic manifold 130 is configured to be operably coupled with the drive vehicle's hydraulic power system. For example, FIG. 2 illustrates one option of coupling multiple hoses 132 to the manifold 130 in order to operably couple the manifold 130 to the drive vehicle's hydraulic system. Hydraulic fluids sent to and received from the brush cutter's hydraulic manifold 130 by the drive vehicle's hydraulic system are routed by the manifold 130 to and from each of the hydraulic motors 120, 122, 124 in order to power the rotary cutting heads 114. FIG. 3 provides a simplified illustration of a fluid supply line 136 and a fluid return line 138 extending between each of the motors and the manifold 130.

As perhaps best seen in FIG. 3, each wing deck 104, 106 is pivotally coupled to one of the sides of the center cutting deck 102. The pivotal coupling can be provided in any suitable manner. In the depicted example, the pivotal coupling is provided by center deck hinge components 150 and wing deck hinge components 152 that are rotatably coupled together in an interlocking fashion about hinge pins 154. The pivotable coupling of each wing deck enables the wing deck to rotate about hinge pins 154, thus pivoting the wing deck relative to the center deck 102 as well as the ground when in use. As will be described with respect to FIGS. 6A-7C, each wing deck 104, 106 can pivot through an angular range of motion that extends from a lowest position (i.e., closest to the ground being cleared) to a highest position (e.g., closest to a vertical orientation).

While in some cases one or both wing decks of a brush cutter may not be pivotable (e.g., they may simply be integral extensions of the center deck), enabling the pivoting of one or both of the wing decks 104, 106 can temporarily reduce the overall width of the rotary brush cutter 100, thus facilitating transport of the brush cutter and making it possible to maneuver the brush cutter 100 into narrow and otherwise restricted locations.

Figure 4:
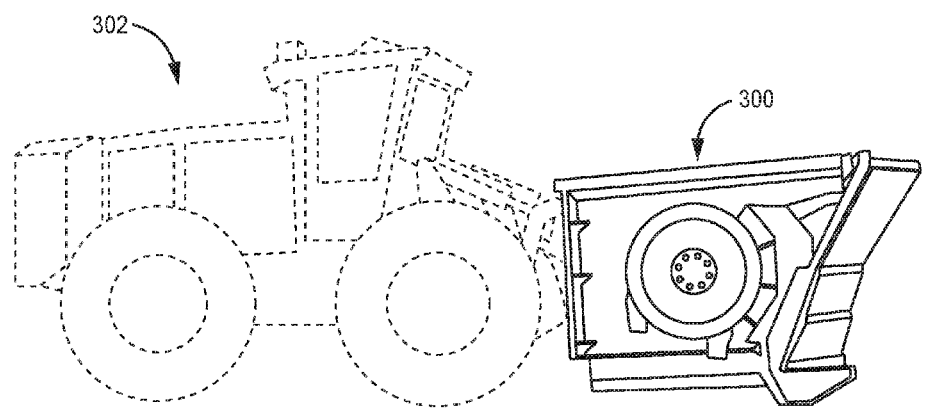
FIG. 4 is a perspective view of a brush cutter attached to a drive vehicle.

As mentioned above, and as will be appreciated from the figures, the hydraulically driven brush cutter 100 shown in FIGS. 1-3 is an attachment-type brush cutter that can be mounted to a drive vehicle. Examples of drive vehicles include, but are not limited to, tractors, utility vehicles, loaders, excavators, and other farm and construction equipment. In some cases the rotary brush cutter 100 is configured to be mounted to, and carried by, a relatively large drive vehicle. One example of such a drive vehicle is a site prep tractor. FIG. 4 is a perspective view of one possible brush cutter 300 attached to the front end of a site prep tractor 302. According to some examples, the brush cutter 100 illustrated in FIGS. 1-3 has an overall cutting width of about sixteen feet, which can correspond to a load weight of about 12,000-13,000 lbs. Accordingly, the illustrated brush cutter is configured to be attached to and used by a site prep tractor, though other types of similarly large vehicles could also be used.

Returning to FIGS. 1 and 2, it can be seen that the brush cutter 100 has a mounting portion 160 that is positioned near the rear of the cutter. More specifically, in this example the mounting portion 160 is positioned at a back side 162 of the rotary cutter. The location of the mounting portion 160 allows the rotary cutter to be mounted to a front boom or bulkhead of a drive vehicle such as a site prep tractor. The operator of the drive vehicle can then use the rotary brush cutter 100 to clear areas in front of the vehicle, which can be useful when making a path through rugged terrain.

As shown in FIGS. 1 and 2, and elsewhere in the figures, the mounting portion 160 of the brush cutter 100 is formed from a combination of lift plates 164 and pins 166. The lift plates 164 and pins 166 provide a mounting configuration that enables a corresponding boom or other front carrier portion of a site prep tractor (or other suitable drive vehicle) to grab onto and hold the mounting portion 160.

Of course the mounting portion of a rotary brush cutter can optionally incorporate one of several other known mounting configurations in order to be attached to and carried by various types of drive vehicles. For example, those skilled in the art will appreciate that multiple manufacturers of farm, forestry, and construction equipment can employ coupling mechanisms with different configurations. The mounting portion 160 of the rotary brush cutter 100 could thus be adapted to correspond to any one of those known coupling configurations.

As discussed above, the wing decks 104, 106 of the brush cutter 100 are pivotally coupled to the center cutting deck 102, allowing them to fold up and down about an axis of rotation near one of the sides of the center deck 102. In some cases pivoting the wing decks of the brush cutter 100 can be useful for a variety of reasons. For example, pivoting the wing decks upward to a highest angular position can minimize the overall width of the brush cutter attachment, thus making it easier for the drive vehicle to maneuver in small areas. In some cases a narrow cutting width may be desirable. Optionally operating the brush cutter 100 with the wing decks pivoted upward can enable cutting with just the center cutting deck 102, as an optional feature.

A further optional feature provided by the pivoting action of the wing decks is an independent adjustment of the angle of each of the wing decks 104, 106. For example, in some cases it may be desirable and/or useful to raise one of the wing decks while leaving the other wing deck in contact with the ground. In addition, the ability to independently pivot the wing decks can aid in clearing uneven terrain in which the angle of one or both of the wing decks 104, 106 may be adjusted to account for rapid and/or uneven changes in ground elevation on one or more sides of the brush cutter 100.

In some cases an operator of the brush cutter 100 can change the angular position of one or both of the wing decks 104, 106 by actuating a movement mechanism that moves the wing deck through the angular range of positions in response to a control signal received from the operator in the drive vehicle. As one example, the brush cutter 100 shown in FIGS. 2 and 3 has two hydraulic cylinders 180 that are controlled by a signal received from the drive vehicle. Each of the cylinders 180 is coupled between the center cutting deck 102 and one of the wing decks 104, 106. Actuating one of the cylinders can thus raise and lower the corresponding wing deck.

In some cases a brush cutter incorporating one or more features of the invention may optionally include an ability to determine information about the angular position of one of the wing decks 104, 106. As an example, the brush cutter 100 shown in the figures includes a sensing arrangement for each of the wing decks 104, 106 that can determine whether the wing deck has reached a particular angular position. As shown in FIG. 3, the brush cutter 100 includes a sensing arrangement located in an area 350 on the left side of the hydraulic manifold 130, and another sensing arrangement located in an area 352 on the right side of the hydraulic manifold 130. In this optional implementation, the sensing arrangements generate signals that provide information about the angular position of the left side wing deck 104 and the right side wing deck 106 with respect to the center cutting deck 102. In some cases the signals can be monitored to determine the position information for each wing cutting deck. In some optional implementations, the signals can trigger one or more additional actions as will be discussed further herein.

Figure 5A:
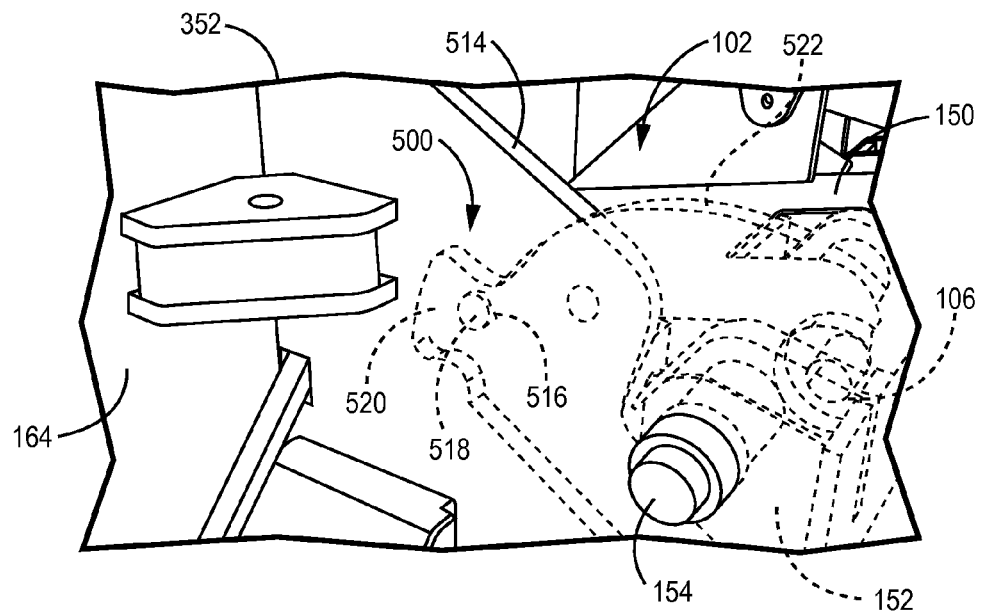
FIG. 5A is a partial perspective view of a sensing arrangement of the brush cutter depicted in FIG. 1.
Figure 5B:
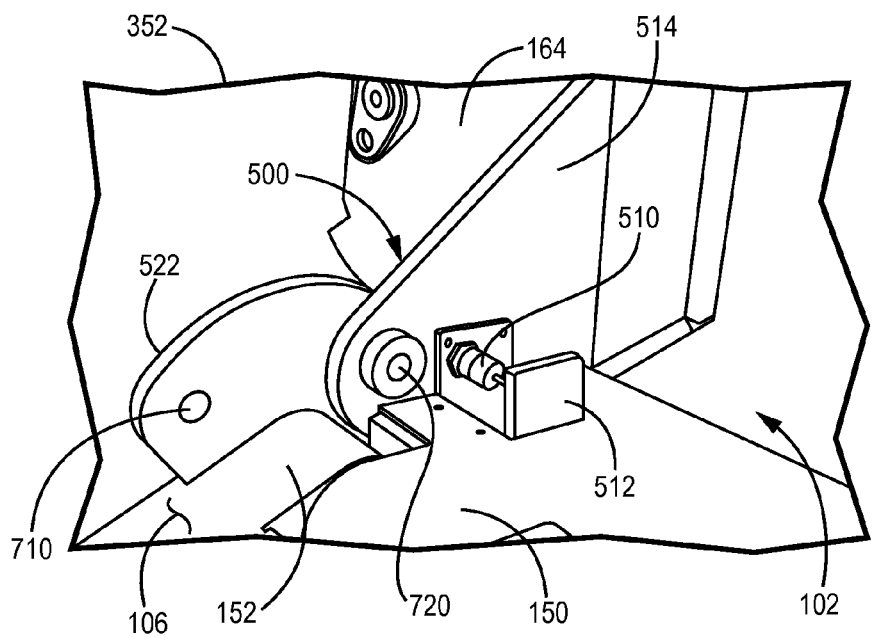
FIG. 5B is another partial perspective view of the sensing arrangement depicted in FIG. 5A.

FIGS. 5A and 5B are enlarged, partial perspective views of the area 352 shown in FIG. 3. FIG. 5A depicts a sensing arrangement 500 within a view of the back side 162 of the center deck 102, while FIG. 5B provides an opposite view of the sensing arrangement 500. To provide a frame of reference, FIGS. 5A and 5B depict one of the mounting plates 164 of the brush cutter mounting portion 160, and also depict hinge components 150 of the center deck 102 and corresponding hinge components 152 of the right cutting deck 106.

According to the depicted embodiment, the sensing arrangement 500 in this example includes a sensor 510 that is mounted to the center cutting deck 102 and a sensing plate 520 that is mounted to the right cutting deck 106. As shown in FIG. 5A, a frame 512 attaches the sensor 510 to the center cutting deck 102 and to a support plate 514. In this optional implementation, the sensing plate 520 is part of a larger wing rotation plate 522 that is fixed to the wing deck 106. The rotation plate 522 rotates with respect to the support plate 514 as the right wing deck 106 pivots about the axis of the hinge pin 154 with respect to the center deck 102.

The support plate 514 defines a hole 516 that is shown in dotted line behind the sensing plate 520 in FIG. 5A. In this example the sensor 510 is configured with a narrow, cylindrical shape and is mounted to the center deck and support plate so that an end or face 518 of the sensor 510 is inserted into the hole 516. As the right cutting deck 106 pivots upward about the hinge pin 154, the sensing plate 520 rotates downward with the wing rotation plate 522. As the sensing plate 520 moves downward, it uncovers the hole 516 and also uncovers the face 518 of the sensor 510 positioned within the hole 516. The sensor 510 detects the movement of the sensing plate 520 and generates an output signal that can be used as the basis for additional action.

In the embodiment illustrated in the figures, the sensor 510 is configured as a proximity sensor that senses the proximity of the sensing plate 520. One example of an inductive proximity sensor that can be used is the four-wire, high current output sensor E57-30JS10-H available from Eaton Corporation plc. The sensor 510 is configured to generate its output signal based on changes in the closeness of the sensing plate 520. The type of output signal can vary depending on the type of sensor being used and the desired control scheme. In some cases a sensor may be used that provides a continuous or analog output signal. In some cases the proximity sensor 510 is configured to generate a discrete or digital signal. For example, the output of the sensor 510 may optionally be a digital signal (e.g., high or low) that indicates whether the face 518 of the sensor is covered by the sensing plate 520 or not.

As one possible example, when the face 518 of the sensor is covered by the sensing plate 520 (as shown in FIGS. 5A and 5B), the sensor 510 may be configured to output a low level signal (e.g., a ground signal) that indicates that the sensor 510 is covered by the sensing plate 520. As another example, the sensor 510 may be configured to provide no output at all when the sensor 510 is covered by the sensing plate. For example, the sensor's output may appear to be an open circuit when the sensing plate 520 is covering the sensor face 518. Further, the sensor 510 may optionally begin generating an output signal at some level (e.g., any level or a high or low level depending on the control scheme being used) when the sensing plate 520 uncovers the face 518 of the sensor.

The amount of uncovering needed for the sensor to generate a desired output signal may vary depending on the type of sensor being used. In some cases in which an inductive proximity sensor is used, the sensor 510 may begin to generate an output signal when the face of the sensor is at least ninety percent uncovered. Further, the type of material used for the sensing plate 520 may vary depending on the type of sensor being used. As one example, the sensing plate 520 can be a metal plate that can be sensed by an inductive proximity sensor. Those skilled in the art will also appreciate that an opposite polarity system may also be used, such that uncovering the sensor 510 generates a low level signal or an open circuit and covering the sensor 510 generates a high level signal or simply completes the circuit to generate a signal instead of an open circuit. Further, the sensing plate 520 and the location of the sensor 510 may optionally be configured so that the sensing plate 520 begins to cover the sensor 510 as the wing deck pivots toward the first angular position and does not cover the sensor face 518 in the lowered position.

The magnitude of the signal generated by the sensor 510 can vary depending on the type of implementation. In some cases the signal level is the level of a positive supply voltage provided by the drive vehicle to the brush cutter 100. Of course in the event of a digital signal, a wide variety of high and low signal levels can be used depending on the needs of a particular application. In some cases the signal level may be chosen based on the requirements of one or more other components that are connected to the sensor 510. As one example, if one or more components require a +24 VDC source for operation, the high signal level may also be +24 VDC, while the low signal level ground or an open circuit.

Figure 6A:
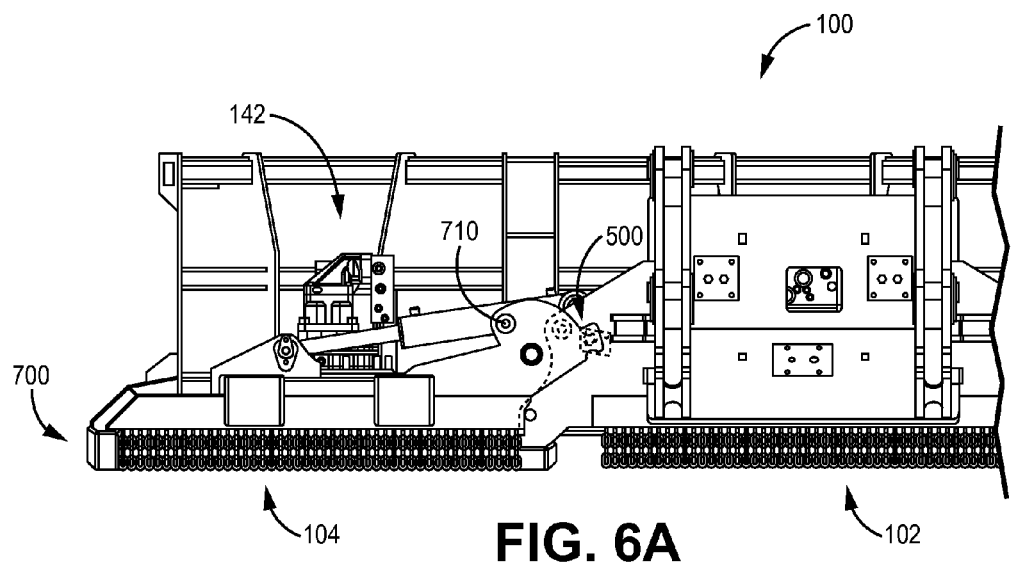
FIGS. 6A-6C are side, partial elevation views of the brush cutter of FIG. 1 with a wing deck at different positions.
Figure 6B:
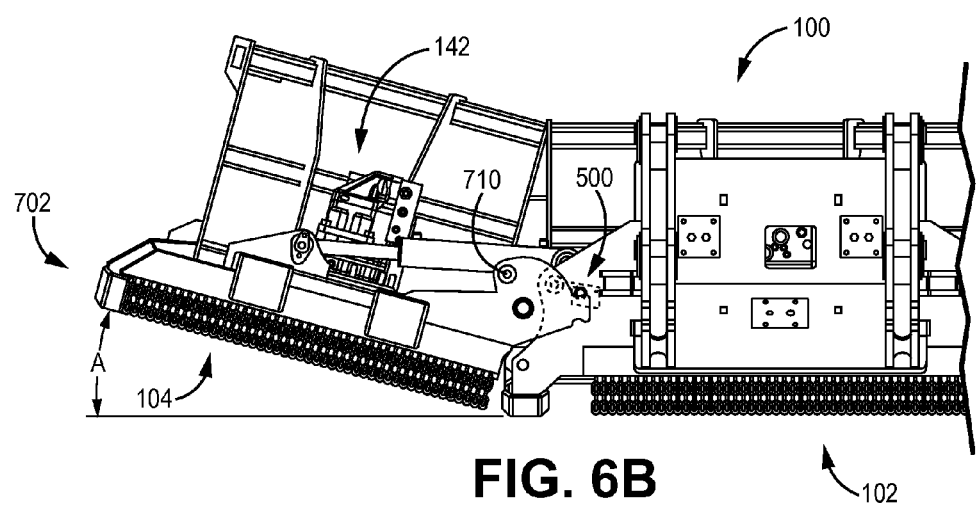
Figure 6C:
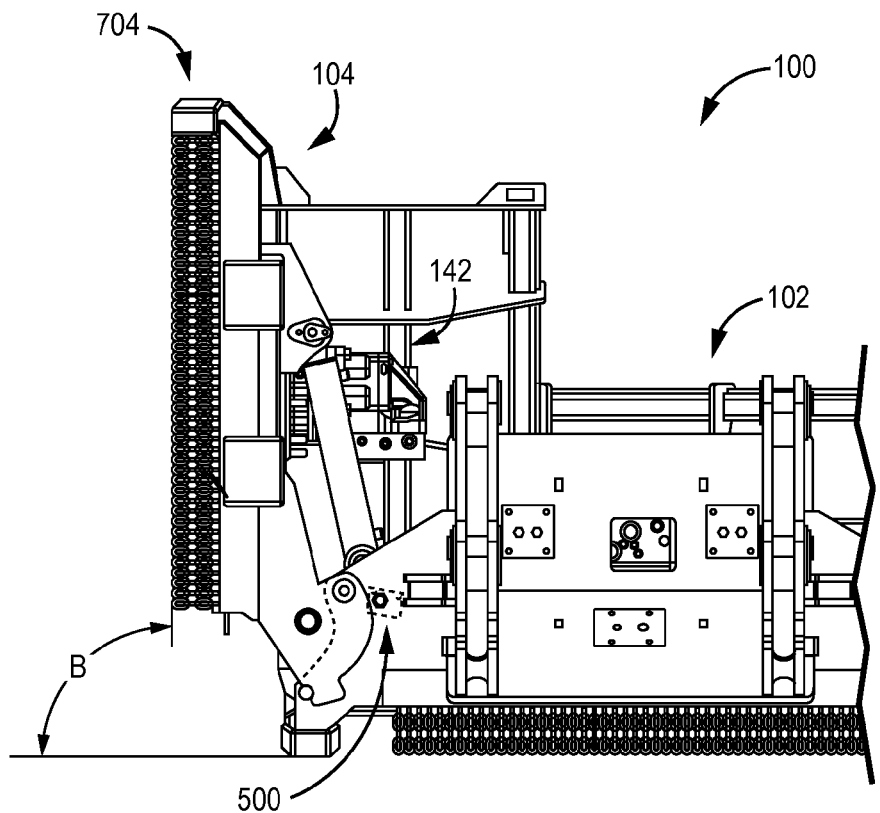
Figure 7C:
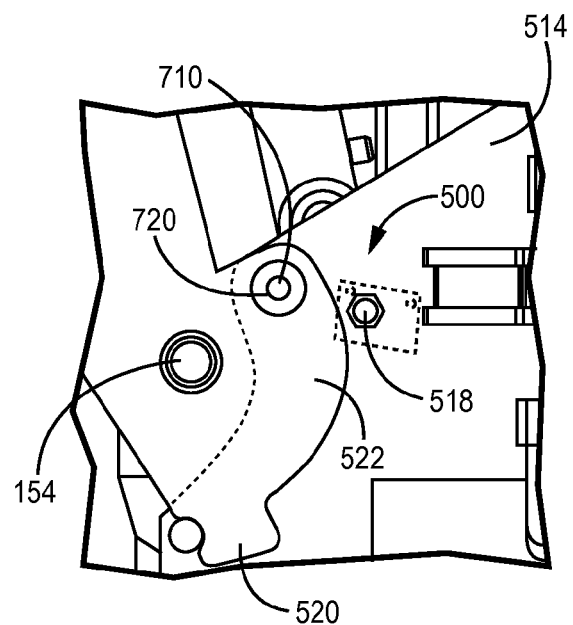
FIGS. 7A-7C are enlarged views of a sensing arrangement of the brush cutter depicted in FIGS. 6A-6C, respectively.
Figure 7A:
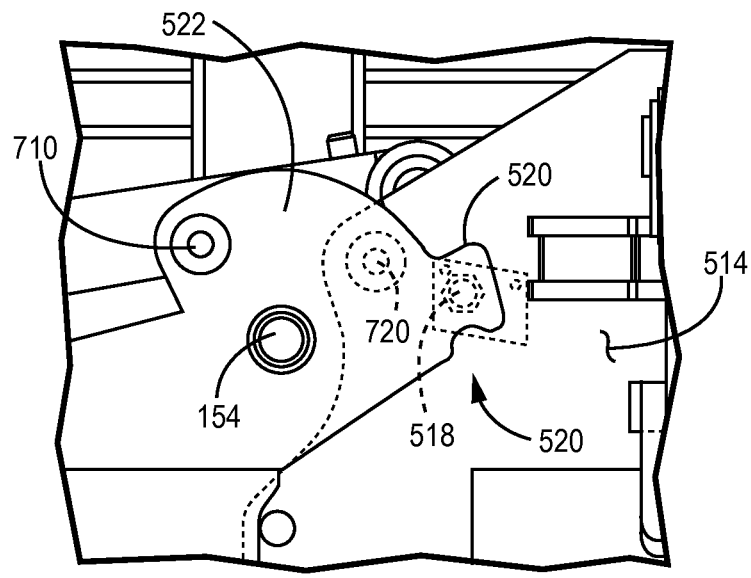
Figure 7B:
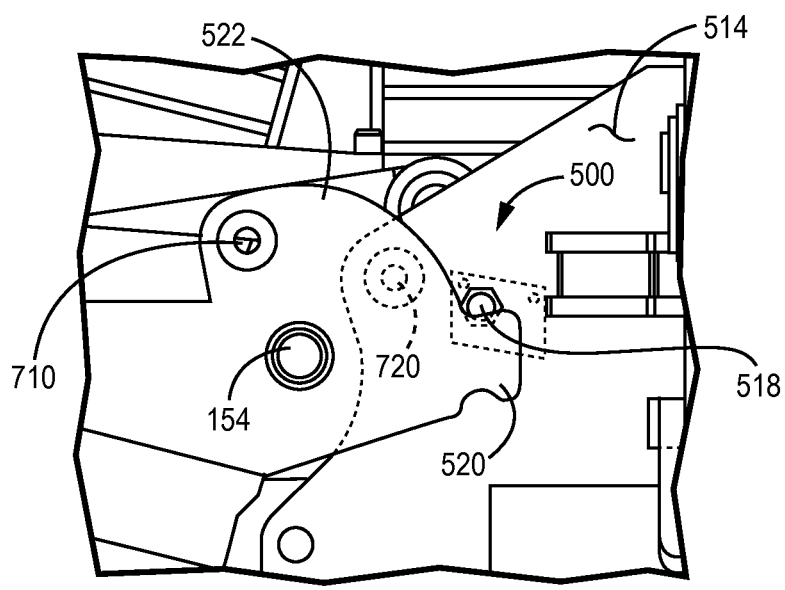

As mentioned above, in some cases a rotary brush cutter may include a sensing arrangement to determine information about a position of one or more wing decks, in order to then take some action based on the information. One optional feature that can be implemented in embodiments of the invention is an ability to shut off the hydraulic cutting assembly for a wing deck when the wing deck is raised off the ground by a particular amount. This capability can make a brush cutter safer to operate and possibly lower the risk of injury for people in the general vicinity of an operating brush cutter. Turning to FIGS. 6A-6C, side, partial elevation views of the brush cutter 100 are provided to illustrate pivoting of a wing deck 104 in conjunction with an operation of the sensing arrangement 500 that enables shut down of the hydraulic cutting assembly 142 mounted to the left wing deck. FIGS. 7A-7C provide enlarged views of the sensor arrangement 500 in FIGS. 6A-6C.

With reference to FIG. 6A, in this depiction the brush cutter 100 is configured with the left wing deck 104 in a lowered position 700. The lowered position 700 in this example corresponds to a generally level position for the wing deck 104 that is approximately coplanar with the center cutting deck 102. This lowered position 700 may or may not be the lowest position possible for the wing deck 104. As shown in FIG. 7A, in the lowered position of this example, the sensing plate 520 completely covers the face 518 of the sensor 510. In this particular implementation, this covered state means that the output of the sensor 510 will appear as an open circuit, with no signal present.

Turning to FIG. 6B, the wing deck 104 has pivoted upward about the pivot hinge axis 154 through an angular range of motion that is approximately A degrees. In this embodiment, the configuration (e.g., the relative size, shape, orientation, distribution, etc.) of the support plate 514, the sensor 510, the wing rotation plate 522, and the sensing plate 520, means that the face 518 of the sensor 510 is nearly completely uncovered when the left wing deck 104 pivots upward from the lowered position 700 by an amount A to a new angular position 702. FIG. 7B is an enlarged view of the sensing arrangement 500 shown in FIG. 6B. As seen in FIG.

7B, when the wing deck 104 is at this new angular position, the sensing plate 520 has nearly uncovered the face 518 of the sensor 510.

In this example the amount of uncovering at this angular position is sufficient to cause the sensor 510 to generate an output control signal. As will be discussed with reference to later figures, the control signal from the sensor 510 in this example is routed to the hydraulic manifold 130 in order to modify the flow of hydraulic fluid being routed to the left deck cutting assembly 142. This allows the sensor 510 and the manifold 130 to shut down the flow of hydraulic fluid to the hydraulic motor when the cutting deck has been raised by a predetermined amount. The amount of angular movement A to bring about shut down can be modified in some cases by changing the physical configuration of the sensing arrangement 500 so that the face of the sensor is uncovered at a lower or higher angular position. In some cases the sensing arrangement 500 is configured so that the sensor 510 outputs a control signal to shut down the hydraulic cutting assembly when the deck has been raised by an amount of about fifteen degrees.

FIG. 6C illustrates the left wing deck 104 in an upright or completely raised position 704. As shown in the figure, the deck 104 has pivoted about the hinge pin axis 154 by an amount B, which in this case is ninety degrees. As shown in FIG. 7C, the sensor 510 is completely uncovered in this angular position, and thus the sensor is outputting a control signal that causes the hydraulic manifold 130 to shut off hydraulic fluid flow to the wing deck hydraulic motor and rotary cutting head.

Returning briefly to FIG. 5B, it can be seen that in this example the wing rotation plate 522 includes a circular opening 710. The support plate 514 also includes a circular opening 720. In this and other implementations, these optional openings 710, 720 are provided so that a pin can be inserted into both openings to secure the wing deck in a raised position. As shown in FIG. 7C, the openings 710, 720 are aligned in this upright position 704, thus enabling a stop pin (not shown) to be inserted into the openings. This optional feature can help in reducing the risk of the wing deck accidentally or mistakenly being lowered when it should not be lowered.

While the previous discussion examined possible angular positions and sensor arrangement operation with respect to the left wing cutting deck 104, it should be appreciated that similar features may optionally be provided for the right wing cutting deck 106, or for both wing cutting decks.

After using a sensing arrangement to generate a control signal, such as in the examples described above, a brush cutter or cutting system may use one or more features, systems, and/or optional elements to take some action based on the control signal. For example, as described elsewhere herein, in some cases the brush cutter 100 may stop the flow of hydraulic fluid to one or more hydraulic cutting assemblies when one or more of the wing decks is raised by a particular amount. Another example that will be described shortly includes the use of the sensing arrangement signals to reduce the total flow of hydraulic fluid being supplied to the hydraulic manifold of the brush cutter.

Figure 8:
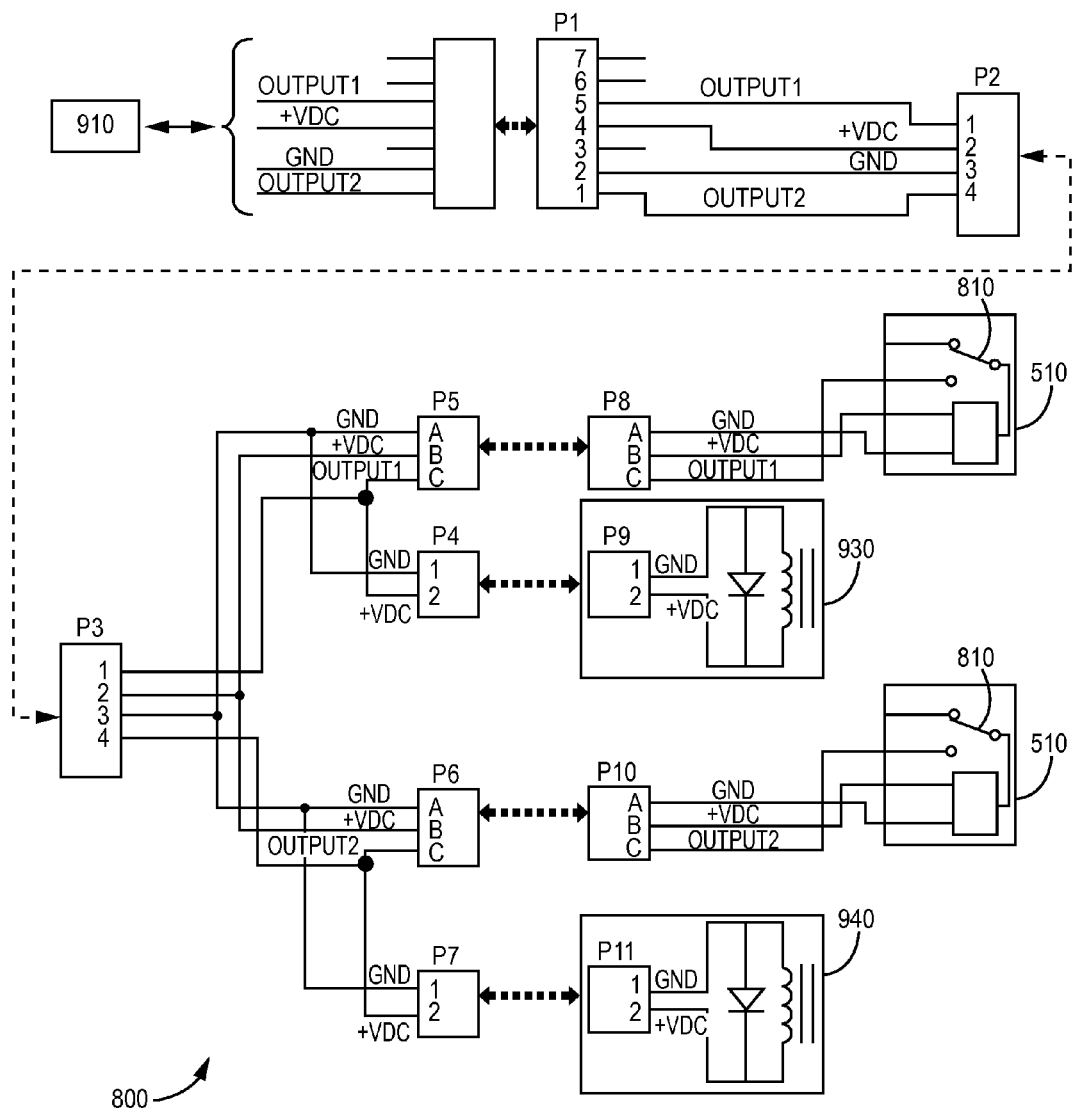
FIG. 8 is a schematic of an electrical control system for the brush cutter of FIG. 1.
Figure 9:
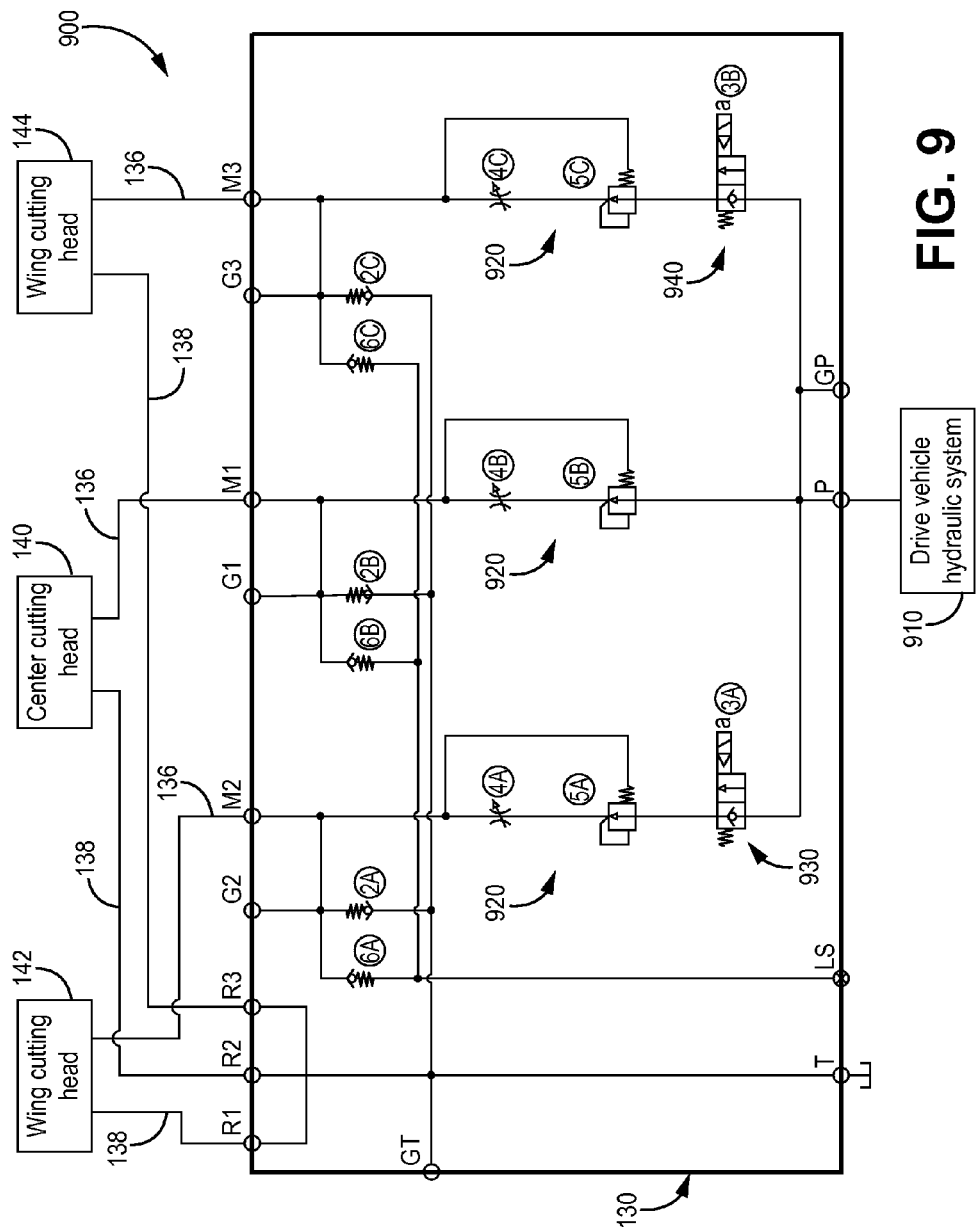
FIG. 9 is a schematic of a hydraulic power system for the brush cutter of FIG. 1.

Turning to FIGS. 8 and 9, an electrical diagram and a hydraulic diagram provide some implementation details for one possible hydraulic flow system 900 and corresponding electrical control system 800 for the brush cutter 100 described above. Turning to FIG. 9, the hydraulic schematic provides a simplified representation of some of the hydraulic elements within the system 900. While in this example and other examples described herein the hydraulic manifold 130 is attached to the brush cutter 100, it should be appreciated that the location of the manifold 130 and/or various parts within the manifold 130 (e.g., valves 930, 940) may vary depending on the particular implementation being used. As just a few examples, some or all of the hydraulic manifold 130 could be located on the boom of a drive vehicle, within the drive vehicle, and/or integrated into the hydraulic system of the drive vehicle.

Turning back to the example in FIG. 9, much of the schematic illustrates the hydraulic flow paths and elements within the hydraulic manifold 130 of the brush cutter 100. As is shown, a source port P of the manifold 130 is operably and fluidly coupled with the hydraulic power system 910 of the drive vehicle carrying the brush cutter 100. Referring back to FIG. 2, the hoses 132 provide this coupling by connecting the manifold 130 to hoses from the carrier's hydraulic power system that extend down the attachment boom, for example.

Turning back to FIG. 9, the manifold 130 generally receives the pressurized hydraulic fluid from the drive vehicle's system 910 and distributes it via supply lines 136 to the center cutting assembly 140, and to the left and the right wing cutting assemblies 142, 144 to power the hydraulic motors that drive the cutting assemblies' rotary cutting heads. The manifold 130 also collects hydraulic fluid from the cutting assemblies 140, 142, and 144 through return lines 138. FIG. 9 also illustrates that in some cases the hydraulic manifold 130 can include source load sense lines (e.g., via port LS) and return line sense capabilities (e.g., via port GT). In addition, in some cases the manifold 130 is provided with components 920 for reducing and/or regulating pressure within the flow lines.

FIG. 9 depicts two valves 930, 940 that can assist in stopping the flow of hydraulic fluid to one or more hydraulic cutting assemblies. In this example, the valves 930, 940 are provided as part of the hydraulic manifold 130 of the brush cutter. One valve 930 is located along the fluid supply line for the left wing cutting assembly 142, while the other valve 940 is located on the fluid supply line for the right wing cutting assembly 144. When the valves 930, 940 are open, they supply the wing cutting assemblies with hydraulic fluid provided by the drive vehicle hydraulic system 910. Closing one or both valves stops the fluid flow to one or both wing cutting assemblies, thus turning off the motors and cutting heads for one or both wing decks.

In the example depicted throughout the figures, the sensing arrangement 500 is configured so that the sensor 510 on the left side of the brush cutter is electrically connected to the valve 930, and the matching sensor 510 on the right side of the brush cutter is electrically connected to the valve 940. Accordingly, the outputs of the sensors 510 send a control signal to the valves 930, 940 that can open or shut the valves, thereby supplying or removing hydraulic power from one or both wing deck cutting assemblies. Any suitable type of hydraulic valve can be used to provide the valves 930, 940. In the illustrated example, the valves 930, 940 are solenoid-controlled valves.

The electrical schematic in FIG. 8 depicts how control signals from the sensing arrangements 500 can operate the valves 930, 940 to start or stop hydraulic fluid flow to the cutting assemblies. The electrical control system 800 includes the sensors 510 for both the left wing deck and the right wing deck that are also shown in FIGS. 5A-7C. The control system 800 provides the sensors 510 and the hydraulic valves 930, 940 with a supply voltage +VDC and a ground connection that are provided by the hydraulic system 910 of the drive vehicle.

As shown in FIG. 8, in this example the sensors 510 include switches 810 that connect and disconnect the sensor output (i.e., OUTPUT1 and OUTPUT2) to and from the supply voltage +VDC. As described with reference to FIGS. 5A-5B, in some cases the sensors 510 are configured to provide no output at all when the face 518 of the sensor is covered by the sensing plate 520. In this state, the sensor 510 toggles its switch 810 to disconnect the output of the sensor, thus providing no signal (e.g., effectively an open circuit) on the output of the sensor. FIG. 8 depicts this state in which the sensor's switch 810 is toggled up to disconnect the output.

Conversely, when the face 518 of the sensor 510 is uncovered, the sensor toggles its switch 810 to connect the output line to the supply voltage +VDC. In this example, energizing OUTPUT1 and/or OUTPUT2 with +VDC also powers one or both of the solenoid valves 930, 940, thus opening and/or closing the fluid supply line to one or both wing cutting assemblies 142, 144. Those skilled in art will appreciate that the sensors 510 and the valves 930, 940 can be configured in a normally open or a normally closed arrangement depending on the specific sensors and valves being used and the type of control that is desired.

The output signals from the sensors 510 can be used to provide other features in addition to powering the valves 930, 940. As can be seen in FIG. 8, in this example the electrical control system 800 also transmits the output signals OUTPUT1 and OUTPUT2 from the sensors 510 through one or more connected cables to the hydraulic control system 910 provided by the drive vehicle. As mentioned before, in some cases these sensing arrangement signals can be used to reduce the total flow of hydraulic fluid being supplied to the hydraulic manifold 130 of the brush cutter by the drive vehicle.

In one optional implementation, when a sensor 510 senses that a wing deck has been raised (e.g., by sensing that the sensing plate has uncovered the sensor face), the sensor 510 provides an output or control signal through its output terminal that in turn energizes a solenoid valve. The valve then closes to turn off hydraulic flow to the wing deck in order to shut down the wing deck's cutting assembly. At the same time, the output signal from the sensor 510 is routed to the hydraulic control system 910 of the drive vehicle. Control logic in the drive vehicle's hydraulic control system interprets the sensor's output signal to determine whether any action should be taken by the drive vehicle's control system.

In one example, the control logic is configured to reduce the overall flow of hydraulic fluid to the brush cutter's manifold 130 if the sensor 510 output indicates that a wing deck has been raised. Reducing the flow of fluid to the brush cutter can be helpful if one or both of the wing deck cutting assemblies have been turned off. For example, if the cutting assembly for one wing deck has been turned off (e.g., it is no longer being supplied with hydraulic fluid), the amount of fluid normally being directed to that cutting assembly must be redirected elsewhere, leading to a risk that the other cutting assemblies may become overwhelmed or the pressure in the hydraulic lines may rise to an unwanted level.

In one possible implementation, the control logic of the drive vehicle's hydraulic control system is configured to reduce the flow of hydraulic drive fluid to the brush cutter's hydraulic manifold 130 by about one-third for each wing deck cutting assembly 142, 144 that has been turned off. Accordingly, after reducing the flow of drive fluid for one raised wing deck, the remaining flow of drive fluid to the hydraulic manifold will be about two-thirds of the amount of the flow usually provided to operate all three cutting assemblies (e.g., the full flow). When two cutting decks are raised and shut off, the remaining drive fluid being sent to the hydraulic manifold may be about one-third of the usual full flow provided for three cutting assemblies. Of course the reduction of drive fluid may be in different amounts depending on, for example, the number of cutting heads on the brush cutter, the flow volume typically used for each cutting head, the tolerance of the brush cutter's hydraulic system to increased line pressures, and/or performance requirements and factors of the drive carrier's hydraulic system 910. In addition, the amount of flow reduction corresponding to each shut down cutting head need not be identical in all circumstances.

The way in which the control logic of the drive carrier's hydraulic system 910 is configured to provide the desired reductions in drive fluid may in some cases depend upon the type of hydraulic system and control system that the drive vehicle employs. In one basic implementation, the control system for the drive vehicle's hydraulic system is connected to the brush cutter's electrical system via four wires that transmit signals between the brush cutter and the drive vehicle for 1) ground, 2) a positive supply voltage (e.g., +VDC in FIG. 8), a first output signal from one of the sensors 510 (e.g., OUTPUT1), and 4) a second output signal from the other of the sensors 510 (e.g., OUTPUT2). In the example described above, the control logic determines the signals present on the output lines from the sensors, and then adjusts the flow of hydraulic fluid accordingly. The hardware and software used to implement the control logic can be any suitable type of hardware and software. Some possible examples include microcontrollers, sensors, and/or other computing elements connected together using a network architecture such as CAN bus. Another example of a mobile hydraulic control and monitoring system is an IQAN system, marketed by Parker Hannifin Corporation.

Along with devices and systems like brush cutters and brush cutting systems, some features and options provided by the invention can be provided as methods for cutting brush and/or operating a machine such as a hydraulically driven rotary brush cutter. According to one possible embodiment, a method is provided for cutting brush with a hydraulically driven rotary brush cutter such as the brush cutter 100 illustrated in the figures and further described above. The method includes operating the brush cutter 100, which includes driving the hydraulic cutting assembly 142 mounted to one wing deck 104, driving the hydraulic cutting assembly 144 mounted to the another wing deck 106, and driving the hydraulic cutting assembly 140 mounted to the center deck 102. The center deck 102 is pivotally coupled to the wing decks 104, 106 as shown in FIGS. 2, 3, 6 and 7.

This example of cutting brush also includes operating the brush cutter 100 with the wing decks 104, 106 in a lowered position and then raising one or both of the wing decks along respective ranges of travel. In some cases a range of travel extends from the lowered position 700 of the wing deck 104 shown in FIG. 6A to the raised or upright position 704 of the wing deck 104 shown in FIG. 6C.

The method of cutting brush also includes sensing the raising of at least one wing deck to a first position along the range of travel. For example, the method can include sensing (e.g., with the sensing arrangement 500) that the left wing deck 104 has been raised to the angular position 702 shown in FIG. 6B. The method then includes generating a control signal, such as generating the OUTPUT1 signal or the OUTPUT2 signal shown in FIG. 8 with the sensing arrangement 500, based on sensing the raising of the wing deck to the first position. The method also includes actuating a valve with the control signal to shut off flow of a drive fluid to the hydraulic cutting assembly 142. In some cases the valve can be part of, or located on, the brush cutter, such as with the example of valves 930, 940 that are part of the hydraulic manifold 130 that is mounted to the center deck 102 of the brush cutter 100. In other implementations, the valve may be located elsewhere, such as on a boom of a drive vehicle, or integrated with the hydraulic power system of the drive vehicle.

In some cases this method for cutting brush can also include carrying the brush cutter 100 with a site prep tractor (e.g., drive vehicle 302 shown in FIG. 4) having a hydraulic system (e.g., the hydraulic system 910 shown in FIG. 9) operably coupled to the hydraulic cutting assemblies 140, 142, 144. Another optional step includes reducing a flow of drive fluid from the hydraulic system of the drive vehicle 910 to the hydraulic manifold 130 based on the control signal (e.g., OUTPUT1, OUTPUT2). In some cases the flow of drive fluid from the hydraulic system to the manifold may be longer or shorter, depending on the location of the hydraulic manifold (e.g., located on the brush cutter attachment, on the drive vehicle boom, in the drive vehicle, part of the drive vehicle's hydraulic system, etc.).

In some cases, methods for cutting brush include the use of hydraulic cutting assemblies that include a rotary cutting head and a hydraulic motor that drives the rotary cutting head. For example, FIG. 1 shows the rotary cutting head 114 of the left wing cutting assembly 142, while FIG. 2 shows the hydraulic motor 122 of the cutting assembly 142. In some cases the method for cutting brush can also include lowering the first wing deck from the raised position (e.g., upright position 704 in FIG. 6C) to a particular position such as the position 702 shown in FIG. 6B. The method then involves sensing the lowering of the wing deck 104 to that position and generating the control signal based on sensing the lowering of the first wing deck to the position. The sensing arrangement 500 that detects upward movement may also sense lowering of the wing deck and then generate a control signal in a similar manner to generating the signals OUTPUT1 and OUTPUT2. The signals can be used to actuate the turned off valve to turn on flow of the drive fluid to the hydraulic cutting assembly 142.

In some cases sensing the raising of the first wing deck and generating the control signal can optionally be performed with a sensor arrangement that has a sensing plate and a sensor that generates the control signal based on relative movement of the sensing plate and the sensor during raising of the wing deck. In some cases the sensor is mounted to the center deck and raising the first wing deck includes moving the sensing plate relative to the sensor. In some cases moving the sensing plate relative to the sensor includes uncovering a face of the sensor.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A hydraulically driven rotary brush cutting system, comprising
    a left wing cutting deck comprising a first hydraulic cutting assembly, a left cutting guard extending upward from a front edge of the left wing cutting deck, and a first skid structure extending from the front edge of the left wing cutting deck at a left side edge of the left wing cutting deck;
    a right wing cutting deck comprising a second hydraulic cutting assembly, a right cutting guard extending upward from a front edge of the right wing cutting deck, and a second skid structure extending from the front edge of the right wing cutting deck at a right side edge of the right wing cutting deck;
    a center cutting deck having a first side pivotally coupled to the left wing cutting deck and a second side pivotally coupled to the right wing cutting deck, the center cutting deck comprising a third hydraulic cutting assembly, and a center cutting guard extending upward from a front edge of the center cutting deck;
    a mounting portion positioned at a back end of the center cutting deck, the mounting portion configured to be attached to a front carrier portion of a drive vehicle;
    a hydraulic manifold operably coupled to each of the first, second, and third hydraulic cutting assemblies, the hydraulic manifold configured to be operably coupled to a hydraulic power system of the drive vehicle and comprising a first valve that controls flow of a drive fluid to the first hydraulic cutting assembly, and a second valve that controls flow of the drive fluid the second hydraulic cutting assembly;
    a first sensing arrangement in communication with the first valve and the hydraulic power system of the drive vehicle; and
    a second sensing arrangement in communication with the second valve and the hydraulic power system of the drive vehicle;
    wherein the first sensing arrangement is configured to sense when the left wing cutting deck pivots upward from a lowered position to a first angular position, signal the first valve to shut off flow of the drive fluid to the first hydraulic cutting assembly, and signal the hydraulic power system to reduce a flow of drive fluid from the hydraulic power system to the hydraulic manifold; and
    wherein the second sensing arrangement is configured to sense when the right wing cutting deck pivots upward from the lowered position to a second angular position, signal the second valve to shut off flow of the drive fluid to the second hydraulic cutting assembly, and signal the hydraulic power system to reduce the flow of drive fluid from the hydraulic power system to the hydraulic manifold
    wherein the brush cutter is configured to clear brush, small trees, and exposed stumps.

2. The system of claim 1, wherein each of the hydraulic cutting assemblies comprises a rotary cutting head and a hydraulic motor that drives the rotary cutting head.

3. The system of claim 1, wherein the first and the second sensing arrangements comprise a sensing plate and a sensor that outputs a control signal to one of the first and the second valves based on relative movement of the sensing plate and the sensor during pivoting of one of the left and the right wing cutting decks.

4. The system of claim 3, wherein the sensor is an inductive sensor that generates the control signal based on proximity of the sensing plate.

5. The system of claim 3, wherein the sensor is mounted to the center cutting deck and the sensing plate is mounted to one of the left and the right wing cutting decks.

6. The system of claim 3, wherein the sensor comprises a sensing face and the sensing plate covers the sensing face in the lowered position.

7. The system of claim 1, wherein the first angular position and the second angular position are each approximately 15° from the lowered position.

8. The system of claim 1, wherein the first sensing arrangement signals the first valve to turn on flow of the drive fluid to the first hydraulic cutting assembly when the left wing cutting deck pivots downward from a raised position to the first angular position; and wherein the second sensing arrangement signals the second valve to turn on flow of the drive fluid to the second hydraulic cutting assembly when the right wing cutting deck pivots downward from the raised position to the second angular position.

9. The system of claim 1, wherein pivoting of the left wing cutting deck is independent from pivoting of the right wing cutting deck.

10. The system of claim 1, wherein each of the first and the second sensing arrangements is configured to signal the hydraulic power system to reduce the flow of drive fluid from the hydraulic power system to the hydraulic manifold by about one third of a full flow of the drive fluid.

11. The system of claim 1, wherein:

the left wing cutting deck further comprises a first top guard rail at the outer side edge of the left wing cutting deck and extending forward from a top edge of the left cutting guard; and the right wing cutting deck further comprise a second top guard rail at the outer side edge of the right wing cutting deck and extending forward from a top edge of the right cutting guard.

12. The system of claim 1, wherein the center cutting deck further comprises two spaced-apart skid structures, one at each side of the center cutting deck and each extending from the front edge of the center cutting deck.

13. The system of claim 1, wherein top edges of the cutting guards have a scalloped shape.

14. A method for cutting brush with a hydraulically driven rotary brush cutter connected to a site prep tractor, comprising:

operating the brush cutter, comprising driving a first hydraulic cutting assembly mounted to a left wing cutting deck wherein the left wing cutting deck comprises a left cutting guard extending upward from a front edge of the left wing cutting deck, and a first skid structure extending front the front edge of the left wing cutting deck at an outer side edge of the left wing cutting deck, driving a second hydraulic cutting assembly mounted to a right wing cutting deck wherein the right wing cutting deck comprises a right cutting guard extending upward from a front edge of the right wing cutting deck, and a second skid structure extending from the front edge of the right wing cutting deck at an outer side edge of the right wing cutting deck, and driving a third hydraulic cutting assembly mounted to a center cutting deck that is pivotally coupled to the first and the right wing cutting decks wherein the center cutting deck comprises a center cutting guard extending upward from a front edge of the center cutting deck;

operating the brush cutter with the left wing cutting deck and the right wing cutting deck in a lowered position;

clearing brush, small trees, and exposed stumps using one or more of the first, second and third hydraulic cutting assemblies;

raising the left wing cutting deck along a range of travel extending from the lowered position to a raised position of the left wing cutting deck;

sensing the raising of the left wing cutting deck to a first position along the range of travel;

generating a control signal based on sensing the raising of the left wing cutting deck to the first position; and actuating a valve with the control signal to shut off flow of a drive fluid to the first hydraulic cutting assembly; and reducing a flow of drive fluid from the hydraulic system of the site prep tractor to the hydraulic manifold based on the control signal.

15. The method of claim 14, further comprising carrying the brush cutter with a site prep tractor having a hydraulic system operably coupled to the first, the second, and the third hydraulic cutting assemblies.

16. The method of claim 14, wherein each of the hydraulic cutting assemblies comprises a rotary cutting head and a hydraulic motor that drives the rotary cutting head.

17. The method of claim 14, further comprising sensing the raising of the left wing cutting deck and generating the control signal with a first sensor arrangement comprising a sensing plate and a sensor that generates the control signal based on relative movement of the sensing plate and the sensor during raising of the left wing cutting deck.

18. The method of claim 17, wherein the sensor is mounted to the center cutting deck and wherein raising the left wing cutting deck comprises moving the sensing plate relative to the sensor.

19. The method of claim 14, further comprising lowering the left wing cutting deck from the raised position to the first position, sensing the lowering of the left wing cutting deck to the first position, generating the control signal based on sensing the lowering of the left wing cutting deck to the first position, and actuating the valve with the control signal to turn on flow of the drive fluid to the first hydraulic cutting assembly.

20. A hydraulically driven rotary brush cutting system, comprising a site prep tractor; and a brush cutter configured to clear brush, small trees, and exposed stumps, the brush cutter comprising:

a left wing cutting deck comprising a first hydraulic cutting assembly, a left cutting guard extending upward from a front edge of the left wing cutting deck, and a first skid structure extending from the front edge of the left wing cutting deck at a left side edge of the left wing cutting deck;

a right wing cutting deck comprising a second hydraulic cutting assembly, a right cutting guard extending upward from a front edge of the right wing cutting deck, and a second skid structure extending from the front edge of the right wing cutting deck at a right side edge of the right wing cutting deck;

a center cutting deck having a first side pivotally coupled to the left wing cutting deck and a second side pivotally coupled to the right wing cutting deck, the center cutting deck comprising a third hydraulic cutting assembly, and a center cutting guard extending upward from a front edge of the center cutting deck;

a mounting portion positioned at a back end of the center cutting deck, the mounting portion configured to be attached to a front carrier portion of the site prep tractor;

a hydraulic manifold operably coupled to each of the first, second, and third hydraulic cutting assemblies, the hydraulic manifold configured to be operably coupled to a hydraulic power system of the drive vehicle and comprising a first valve that controls flow of a drive fluid to the first hydraulic cutting assembly, and a second valve that controls flow of the drive fluid the second hydraulic cutting assembly;

a first sensing arrangement in communication with the first valve and the hydraulic power system of the site prep tractor; and a second sensing arrangement in communication with the second valve and the hydraulic power system of the site prep tractor;

wherein the first sensing arrangement is configured to sense when the left wing cutting deck pivots upward from a lowered position to a first angular position, signal the first valve to shut off flow of the drive fluid to the first hydraulic cutting assembly, and signal the hydraulic power system to reduce a flow of drive fluid from the hydraulic power system to the hydraulic manifold; and wherein the second sensing arrangement is configured to sense when the right wing cutting deck pivots upward from the lowered position to a second angular position, signal the second valve to shut off flow of the drive fluid to the second hydraulic cutting assembly, and signal the hydraulic power system to reduce the flow of drive fluid from the hydraulic power system to the hydraulic manifold.

* * * * *

UNITED STATES PATENT AND TRADEMARK OFFICE
CERTIFICATE OF CORRECTION

PATENT NO.          : 9,648,806 B2
APPLICATION NO.     : 14/698524
DATED               : May 16, 2017
INVENTOR(S)         : Joseph Gordon Fulton et al.

It is certified that error appears in the above-identified patent and that said Letters Patent is hereby corrected as shown below:

In the Claims

Claim 1, Column 16, Line 26, "drive fluid the" should read --drive fluid to the--.

Claim 11, Column 17, Line 31, "comprise" should read --comprises--.

Claim 14, Column 17, Line 50, "extending front the front edge" should read --extending from the front edge--.

Claim 24, Column 19, Line 11, "drive fluid the second" should read --drive fluid to the second--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*